United States Patent
Xue

(10) Patent No.: US 9,578,503 B2
(45) Date of Patent: Feb. 21, 2017

(54) AUTHENTICATION METHOD AND AUTHENTICATION DEVICE FOR WIRELESS ROUTER

(71) Applicant: HUIZHOU TCL MOBILE COMMUNICATION CO., LTD., Huizhou (CN)

(72) Inventor: Min Xue, Huizhou (CN)

(73) Assignee: HUIZHOU TCL MOBILE COMMUNICATION CO., LTD., Huizhou (CN)

( * ) Notice: Subject to any disclaimer, the term of this patent is extended or adjusted under 35 U.S.C. 154(b) by 0 days.

(21) Appl. No.: 14/422,557

(22) PCT Filed: Apr. 16, 2014

(86) PCT No.: PCT/CN2014/075525
§ 371 (c)(1),
(2) Date: Feb. 19, 2015

(87) PCT Pub. No.: WO2015/021787
PCT Pub. Date: Feb. 19, 2015

(65) Prior Publication Data
US 2015/0230085 A1     Aug. 13, 2015

(30) Foreign Application Priority Data

Aug. 15, 2013   (CN) .......................... 2013 1 0355421

(51) Int. Cl.
*G06F 15/16* (2006.01)
*H04L 29/06* (2006.01)
(Continued)

(52) U.S. Cl.
CPC ........ *H04W 12/06* (2013.01); *G06F 17/30725* (2013.01); *G06K 7/10861* (2013.01);
(Continued)

(58) Field of Classification Search
CPC ........ G06F 21/31; H04L 63/083; H04L 63/08; H04L 63/102; H04L 63/085
(Continued)

(56) References Cited

U.S. PATENT DOCUMENTS

2006/0217071 A1* 9/2006 Russo .................. H04W 16/14
                                                          455/66.1
2008/0037786 A1    2/2008 Park
(Continued)

FOREIGN PATENT DOCUMENTS

CN          1547405 A      11/2004
CN        101605329 A      12/2009
(Continued)

OTHER PUBLICATIONS

Search report from PCT application No. PCT/CN2014/075525 dated Feb. 19, 2015.
(Continued)

*Primary Examiner* — Evans Desrosiers
(74) *Attorney, Agent, or Firm* — Shimokaji IP

(57) ABSTRACT

The present disclosure relates to an authentication method and an authentication device for a wireless router. The authentication method may first generate a corresponding 2-dimensional barcode with BSSID and PIN codes of the wireless router. The authentication method may scan the 2-dimensional barcode and may resolve the scanned 2-dimensional barcode to corresponding BSSID and PIN codes. The authentication method may correlate the corresponding wireless router according to the BSSID, may activate a WPS process of the wireless router, and may access a network provided by the wireless router via the PIN code. Thereby, a user can access a wireless router and may go online by using a mobile terminal to scan a 2-dimensional barcode. As a result, the mobile terminal can be conveniently and quickly (Continued)

connected to a wireless router, which may greatly reduce the user's operations and results in great convenience for users.

14 Claims, 1 Drawing Sheet

(51) Int. Cl.
*H04W 12/06* (2009.01)
*G06F 17/30* (2006.01)
*G06K 7/10* (2006.01)
*H04W 12/04* (2009.01)
*H04W 84/12* (2009.01)
*G06K 19/06* (2006.01)
*G07F 7/10* (2006.01)

(52) U.S. Cl.
CPC ........... *H04L 63/083* (2013.01); *H04W 12/04* (2013.01); *H04W 84/12* (2013.01); *G06K 19/06028* (2013.01); *G06K 19/06037* (2013.01); *G07F 7/10* (2013.01)

(58) Field of Classification Search
USPC ......... 713/168–174, 182–186, 202; 709/206, 709/225, 229, 249, 389; 726/2–8
See application file for complete search history.

(56) References Cited

U.S. PATENT DOCUMENTS

| | | | | |
|---|---|---|---|---|
| 2012/0182877 | A1* | 7/2012 | Swaminathan | H04W 24/00 370/242 |
| 2013/0276075 | A1* | 10/2013 | Gong | H04W 76/02 726/5 |
| 2013/0339865 | A1* | 12/2013 | Oslund | H04L 41/22 715/736 |

FOREIGN PATENT DOCUMENTS

| | | |
|---|---|---|
| CN | 102395216 A | 3/2012 |
| CN | 103179640 A | 6/2013 |
| CN | 103415012 A | 11/2013 |

OTHER PUBLICATIONS

Search Report and Office Action from CN Application No. 201310355421.1 dated Mar. 29, 2016.

\* cited by examiner

AUTHENTICATION METHOD AND AUTHENTICATION DEVICE FOR WIRELESS ROUTER

TECHNICAL FIELD

The present disclosure relates to wireless network authentication. In particular, the present disclosure relates to an authentication method and an authentication device for a wireless router using a barcode.

BACKGROUND

Currently, when a cell phone is used to access a wireless router, existing authentication methods, such as WPA (Wi-Fi Protected Access), requires provision of information, such as SSID (Service Set Identifier), encryption modes and secret keys. Even for a relatively advanced WPS (Wi-Fi Protected Setup), authentication can only be completed by inputting a PIN (Personal Identification Number) code or via button operations on an accessing terminal. As a result, a user has to look for a SSID, and has to perform operations, such as password input, which is time consuming and inconvenient. Moreover, when a configuration of a wireless router is changed, a user must re-configure access information of an associated cell phone, which results in great inconvenience for the user.

Therefore, the prior art needs to be improved and developed.

SUMMARY

The technical problems that the present invention intends to solve are to provide an authentication method and an authentication device for a wireless router using a barcode. The present invention eliminates complex wireless authentication operations, which cause inconvenience for users.

The present invention employs the following technical solutions:

An authentication method for a wireless router includes: generating a corresponding two-dimensional barcode with BSSID and PIN codes of the wireless router; scanning a two-dimensional barcode; resolving the scanned two-dimensional barcode to the BSSID and PIN codes; correlating the wireless router according to the BSSID code;
activating a WPS process of the wireless router; and
accessing a wireless network, provided by the wireless router, via the PIN code.

In another embodiment, an authentication method for a wireless router includes detecting if a WIFI function is turned on, and scanning the two-dimensional barcode and resolving the scanned two-dimensional barcode to the corresponding BSSID and PIN codes when the WIFI function is turned on.

In yet another embodiment, an authentication method for a wireless router includes a BSSID code that is a MAC address of the wireless router.

In a further embodiment, an authentication method for a wireless router includes a MAC address that contains a PIN code.

In yet a further embodiment, an authentication method for a wireless router includes storing BSSID and PIN codes.

In another embodiment, an authentication method for a wireless router includes a BSSID code that is a MAC address of the wireless router and the MAC address contains a PIN code.

In yet another embodiment, an authentication method for a wireless router includes a two-dimensional barcode, generated with BSSID and PIN codes of the wireless router, attached to a back of a wireless device.

In a further embodiment, an authentication method for a wireless router includes setting a PIN code to an eight-digit decimal number corresponding to a last 4-digit hexadecimal number of a MAC address.

In yet a further embodiment, an authentication method for a wireless router includes generating a two-dimensional barcode with BSSID and PIN codes of the wireless router; the BSSID is a MAC address of the wireless router and the MAC address contains a PIN code; detecting if a WIFI function is turned on; scanning the two-dimensional barcode; resolving the scanned two-dimensional barcode to the BSSID and PIN codes; storing the BSSID and PIN codes; correlating the wireless router according to the BSSID code; activating a WPS process of the wireless router; and accessing a wireless network, provided by the wireless router, via the PIN code.

In another embodiment, an authentication device for a wireless router includes a two-dimensional barcode generating module for generating a two-dimensional barcode with BSSID and PIN codes of the wireless router; a two-dimensional barcode scanning module for scanning the two-dimensional barcode; a two-dimensional barcode resolving module for resolving the two-dimensional barcode to the BSSID and PIN codes; a WPS wireless connecting module for correlating the wireless router according to the BSSID code; for activating a WPS process of the wireless router; and for accessing a wireless network, provided by the wireless router, via the PIN code.

In yet another embodiment, an authentication device for a wireless router includes a WIFI function detection module for detecting if a WIFI function is turned on.

In a further embodiment, an authentication device for a wireless router includes an encoding unit for encoding a PIN code into a MAC address.

In yet a further embodiment, an authentication device for a wireless router includes a storage unit for storing resolved BSSID and PIN codes.

An authentication method and authentication device for a wireless router, according to the present invention, eliminates complex operations for a mobile terminal to access a wireless router. An authentication method generates a two-dimensional barcode with BSSID and PIN codes of the wireless router; scans the two-dimensional barcode and resolves the two-dimensional barcode to the BSSID and PIN codes; correlates the wireless router according to the BSSID code, activates a WPS process of the wireless router, and accesses a wireless network, provided by the wireless router, via the PIN code. Generation of a corresponding two-dimensional barcode, with BSSID and PIN codes of a wireless router, allows a user to access a wireless router and go online by using a mobile terminal to scan a two-dimensional barcode, which greatly reduces the user's operations and results in great convenience for users. A method of authentication for a wireless router is simple and can be implemented through software, leading to a relatively low cost.

DETAILED DESCRIPTION

An authentication method and authentication device for a wireless router are provided. To make the objects, technical solutions and advantages of the present invention clearer, the present invention is described with reference to the accompanying drawings and embodiments. It should be understood that the specific embodiments described herein are for illustrative purposes. The specific embodiments are not intended to limit the scope of the present invention in any way.

Figure 1:
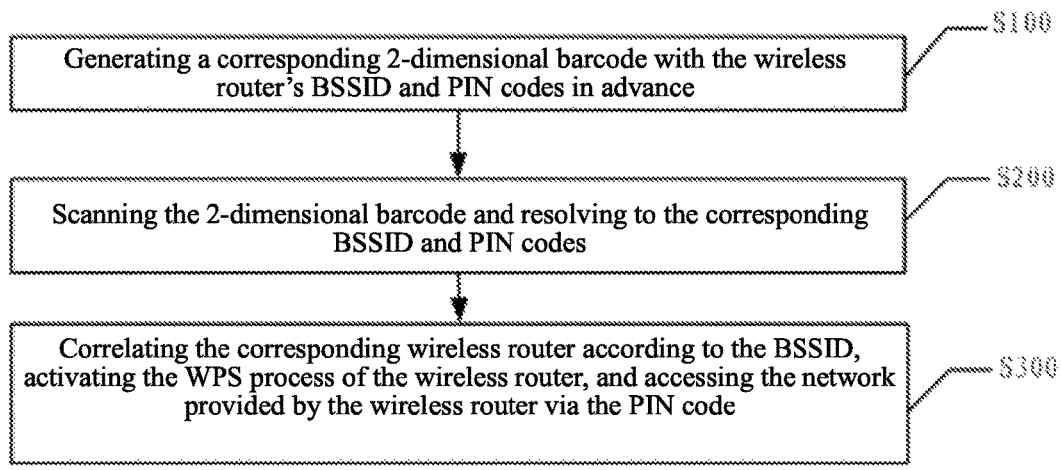
FIG. 1 is a flow chart of a preferred embodiment of an authentication method for a wireless router according to the present invention.

With reference to FIG. 1, an authentication method for a wireless router may include generating a two-dimensional barcode with BSSID and PIN codes of the wireless router (block S100). The method may also include scanning the two-dimensional barcode and resolving the two-dimensional bar code to the BSSID and PIN codes (block S200). The method may further include correlating the wireless router according to the BSSID code, activating a WPS process of the wireless router, and accessing a wireless network, provided by the wireless router, via the PIN code (block S300).

Authentication for a wireless router is described with reference to specific embodiments. Authentication for a wireless router may include generating a two-dimensional barcode with BSSID and PIN codes of the wireless router. Both the BSSID (Basic Service Set Identifier) and the access authentication information of an access terminal may change due to changes by a user. To make an access process transparent to a user, i.e. the cell phone can access the wireless router quickly no matter how the user changes the BSSID and/or the authentication information (password, etc.). Authentication for a wireless router may mix and encode the BSSID (Basic Service Set ID, i.e. the MAC address of the site) and WPS (Wi-Fi Protected Setup) PIN codes, of a wireless router, to a two-dimensional barcode. Authentication for a wireless router may correlate a two-dimensional barcode to the wireless router, for example, by attaching a unique two-dimensional barcode to a back of a wireless device. A BSSID, a special application of an Ad-hoc LAN, may be referred to as a Basic Service Set (BSS). When a group of computers are set to the same BSS, the group of computers can form a group by themselves. Each BSS within the group of computers may be assigned a BSSID, which may be, for example, a forty-eight digit-long binary identifier for identifying each different BSS.

A mobile terminal may scan a two-dimensional barcode, and may resolve the two-dimensional barcode to the corresponding BSSID and PIN codes. For example, a cell phone may scan a two-dimensional barcode corresponding to the wireless router by turning on a camera of the cell phone, and then may correspondingly identify the two-dimensional barcode as the BSSID and PIN codes correlated with the cell phone. The cell phone may store the BSSID and PIN codes for convenient reading in the future. Once the BSSID and PIN codes are stored, there is no need to scan the two-dimensional barcode again, i.e., anytime the cell phone is close to the corresponding wireless router, the cell phone is automatically authenticated to go online with the recorded BSSID and PIN codes.

A mobile terminal may correlate a corresponding wireless router according to an identified BSSID code, may activate a WPS process of a wireless router, i.e. the one-key encryption function, performs one-key encryption via the PIN code, and may subsequently accesses a network, provided by the wireless router, to go online. A WiFi module of a mobile terminal may scan networks close by, and the mobile terminal may match an identified BSSID with multiple networks that have been scanned. If matching is successful, the network may be determined to be a wireless network corresponding to the authenticated wireless router. When a wireless network is determined to be authenticated, the mobile terminal may subsequently perform a WPS process, i.e. a one-key encryption process, according to an identified BSSID. One-key encryption processes are known in the prior art, thus, a one-key process will only be described briefly herein. A pin code of a router may be an identification code of a QSS (Quick Secure Setup) quick connection function. For example, if a user sets up a very complicated wireless password, it is very inconvenient to type in the password every time when a device accesses the wireless network. Using a one-key encryption process, a mobile terminal is permitted to access a network by inputting an eight-digit pin code for identification by the router, which is equivalent to input of the wireless password. In such a way, the mobile terminal may know BSSID and PIN codes of the wireless router, and according to a WPS protocol, any router with a WPS function (i.e. the one-key encryption function) can be safely accessed. Thereby, a permanent access authentication identifier may be realized for a wireless device, and any cell phone, or other smart terminals installed with a WBPS client, can conveniently and safely access the wireless router.

Authentication for a wireless router may include detecting if a WIFI function is turned on, and may scan the two-dimensional barcode and may resolve the two-dimensional bar code to BSSID and PIN codes when the WIFI function is turned on. If the WIFI function is detected to not be turned on, a mobile device may prompt a user to turn on the WIFI function, or the WIFI function may be automatically turned on. If the WIFI function has been turned on, the two-dimensional barcode may be scanned and the two-dimensional bar code may be resolved to BSSID and PIN codes.

A BSSID code may be a MAC (Media Access Control) address of a wireless router. A MAC address may contain a PIN code. Specifically, the MAC address may be a twelve-digit hexadecimal number. The PIN code may be an eight-digit decimal number. To make encoding and decoding convenient, the present invention may choose that a MAC address implicitly contains a PIN code, i.e. by setting the PIN code to be an eight-digit decimal number corresponding to the last four-digit hexadecimal number of the MAC address. For example, assume a MAC address of a device is 00:19:2A:68:E3:21, then the last four-digit hexadecimal number E3:21 may be expanded to an eight-digit decimal number of 14 03 02 01. In such a way, BSSID and PIN codes of the device can be uniquely determined through the MAC address of the device, which may be 00:19:2A:68:E3:21 and 14030201, respectively.

An authentication method for a wireless router may be a WPS-based mobile terminal Wi-Fi authentication technique, i.e. Alcatel WBPS (Alcatel Wi-Fi Barcode Protected Setup). WBPS is an expansion based on the WPS method, which may use access point information encoded in a two-dimensional barcode to quickly connect a device using the method of WPS PIN-label. Any smart terminal that supports WBPS can be quickly connected into an AP device by scanning the WBPS code without any additional operations.

Use of an authentication method for a wireless router is described below with reference to a cell phone as an example. The authentication method for the wireless router may be used as a WBPS client, and may be installed in the cell phone. Both the cell phone and the wireless router may support a WPS protocol. A two-dimensional barcode may be generated with BSSID and PIN codes of the wireless router, and may be attached to the wireless router. In practical use, multiple corresponding two-dimensional barcodes may be configured and attached to locations that are convenient for a user to scan, such as on a wall or a desk. Subsequently, the user may activate a WBPS client on the cell phone. When a WBPS client is activated, a WIFI function of the mobile terminal may be detected to determine if the WIFI function is turned on. If the WIFI function is not turned on, the WIFI function may be automatically turned on. Then, the user may scan a two-dimensional barcode, and the two-dimensional bar code may be resolved to BSSID and PIN codes through a WBPS client. At the same time, the WIFI function of the cell phone may search networks close by, the WBPS client may send a command to a Wi-Fi module to correlate an access point (AP) with a designated BSSID. Further at the same time, a WPS process of the wireless router may be activated, and access to a network may be provided by the wireless router via the PIN code. A generated two-dimensional barcode may further be encrypted, and the cell phone client may perform decryption so as to improve security.

Figure 2:
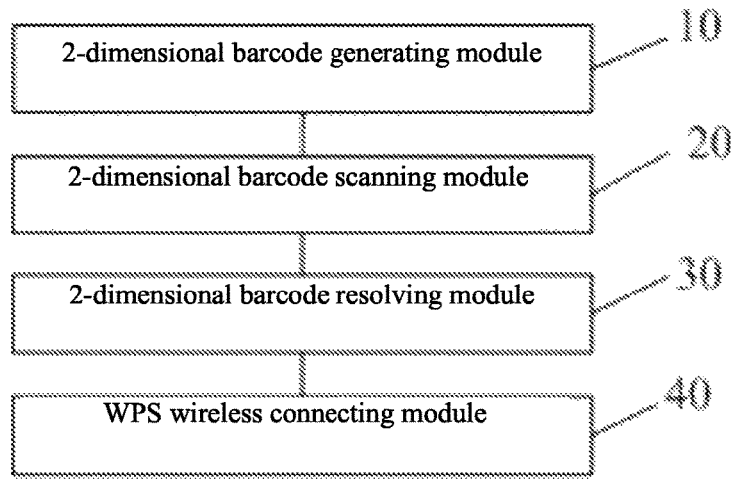
FIG. 2 is a structural block diagram of a preferred embodiment of an authentication device for a wireless router according to the present invention.

Based on the above authentication method for a wireless router, an authentication device for a wireless router may be provided. Turning to FIG. 2, a structural block diagram of an authentication device for a wireless router may include a two-dimensional barcode generating module 10 for generating a corresponding two-dimensional barcode with. The device may also include a two-dimensional barcode scanning module 20 for scanning the two-dimensional barcode. The device may further include a two-dimensional barcode resolving module 30 for resolving the two-dimensional barcode to the BSSID and PIN codes.

The device may yet further include a WPS wireless connecting module 40 for correlating the corresponding wireless router according to the BSSID code, for activating a WPS process of the wireless router, and for accessing a network provided by the wireless router via the PIN code.

An authentication device for a wireless router may further include a WIFI function detection module for detecting if a WIFI function is turned on. An authentication device for a wireless router may yet further include an encoding unit for encoding a PIN code into a MAC address. Specifically, the MAC address may implicitly contain a PIN code, i.e. by setting the PIN code to be an eight-digit decimal number corresponding to the last four-digit hexadecimal number of the MAC address.

An authentication device for a wireless router may also include a storage unit for storing resolved BSSID and PIN codes. A two-dimensional barcode generating module 10 may generate a two-dimensional barcode with BSSID and PIN codes of the wireless router, and the two-dimensional barcode may then be placed at a convenient location for subsequent scanning. A WIFI function detection module may detect if a WIFI function of the mobile terminal is turned on and, when the WIFI function of the mobile terminal is turned on, the two-dimensional barcode scanning module 20 may scan a two-dimensional barcode. The barcode scanning module 20 may send the two-dimensional barcode to a two-dimensional barcode resolving module 30, and the two-dimensional barcode resolving module 30 may resolve the two-dimensional barcode to the BSSID and PIN codes. A WPS wireless connecting module 40 may correlates a wireless router according to the BSSID code, may activate a WPS process of the wireless router, i.e. the one-key encryption function, and the mobile terminal may access a network of the wireless router via the PIN code.

In summary, an authentication method and an authentication device for a wireless router are provided. The authentication method may generate a corresponding two-dimensional barcode with BSSID and PIN codes of the wireless router, may scan the two-dimensional barcode, may resolve the two-dimensional barcode to BSSID and PIN codes. The method may also correlate the wireless router according to the BSSID code, may activate a WPS process of the wireless router, and may accesses a network provided by the wireless router via the PIN code. With the generation of a corresponding two-dimensional barcode with BSSID and PIN codes of the wireless router, a user can access the wireless router and go online by using a mobile terminal to scan a two-dimensional barcode. As a result, the mobile terminal can be conveniently and quickly connected to the wireless router, which may greatly reduce required user operations, and may result in great convenience for users. Use of the authentication method may be simple and can be implemented through software, leading to a relatively low cost.

It should be understood that applications of the present invention are not limited to the above examples. To those skilled in the art, improvements or modifications may be made according to the above description, and all of these improvements or modifications shall be encompassed by the scope of the appended claims.

The invention claimed is:

1. An authentication method, the method comprising:
scanning a two-dimensional barcode comprising BSSID and PIN codes of a wireless router, wherein the two-dimensional barcode is attached to the wireless router, and wherein the BSSID is a MAC address of the wireless router and the MAC address contains a PIN code;
resolving the scanned two-dimensional barcode to the BSSID and PIN codes;
storing the BSSID and PIN codes;
correlating the wireless router according to the BSSID code; and
accessing a wireless network by activating a WPS process of the wireless router and using the PIN code to authenticate on the wireless router when a WIFI function is turned on, wherein the PIN code is used automatically without a user input.

2. The method according to claim 1, further comprising:
detecting if a WIFI function is turned on, and scanning the two-dimensional barcode and resolving the scanned two-dimensional barcode to the corresponding BSSID and PIN codes when the WIFI function is turned on.

3. The method according to claim 1, wherein the MAC address contains the PIN code.

4. The method according to claim 1, wherein the wireless network is accessed by a cell phone.

5. The method according to claim 1, further comprising: scanning the two-dimensional barcode using a camera.

6. The method according to claim 1, further comprising: setting the PIN code to be an eight-digit decimal number corresponding to a last four-digit hexadecimal number of the MAC address.

7. An authentication method, the method comprising:
detecting if a WIFI function is turned on and if the WIFI function is off then prompting a user to turn on the WIFI function;
scanning a two-dimensional barcode attached to a wireless router, where the two-dimensional barcode includes BSSID and PIN codes of the wireless router where the BSSID is a MAC address of the wireless router and the MAC address contains a PIN code;
resolving the scanned two-dimensional barcode to the BSSID and PIN codes;
storing the BSSID and PIN codes;
correlating the wireless router according to the BSSID code;
activating a WPS process of the wireless router; and
accessing a wireless network, provided by the wireless router, via the PIN code automatically without a user input of the PIN code.

8. The method according to claim 7, further comprising: setting the PIN code to be an eight-digit decimal number corresponding to a last 4-digit hexadecimal number of the MAC address.

9. An authentication device for a wireless router, the device comprising:
a two-dimensional barcode generating module for generating a two-dimensional barcode with BSSID and PIN codes of the wireless router, wherein the two-dimensional barcode is attached to the wireless router, and wherein the BSSID is a MAC address of the wireless router and the MAC address contains a PIN code;
a two-dimensional barcode scanning module for scanning the two-dimensional barcode;
a two-dimensional barcode resolving module for resolving the two-dimensional barcode to the BSSID and PIN codes;
a WPS wireless connecting module for:
correlating the wireless router according to the BSSID code;
activating a WPS process of the wireless router; and
authenticating and accessing a wireless network by activating the WPS process via the PIN code automatically without a user input of the PIN code.

10. The device according to claim 9, further comprising: a WIFI function detection module for detecting if a WIFI function is turned on.

11. The device according to claim 9, further comprising: an encoding unit for encoding the PIN code into a MAC address.

12. The device according to claim 9, further comprising: a storage unit for storing the resolved BSSID and PIN codes.

13. The device according to claim 9, wherein the two-dimensional barcode, generated with the BSSID and PIN codes, is attached to a back of the wireless router.

14. The device according to claim 9, wherein the PIN code is set to an eight-digit decimal number corresponding to a last 4-digit hexadecimal number of the MAC address.

* * * * *